(12) United States Patent
Davis et al.

(10) Patent No.: US 11,305,729 B2
(45) Date of Patent: Apr. 19, 2022

(54) WHEEL FASTENER ALARM

(71) Applicant: MacLean-Fogg Company, Mundelein, IL (US)

(72) Inventors: David J. Davis, Rochester, MI (US); Kryzysztof Misztur, Streamwood, IL (US); Christian Muehlich, Whitewater, MI (US); Robert E. Whitney, Libertyville, IL (US); Larry J. Wilson, Commerce Township, MI (US); Marcus A. Zagorniak, Charlotte, NC (US); Steven R. Fister, Tucson, AZ (US); Mark Raves, Commerce Township, MI (US); Luke Michael Roberts, Madison Heights, MI (US); Ben Wilmhoff, Louisville, CO (US); Bennett Whitney, Libertyville, IL (US)

(73) Assignee: MACLEAN-FOGG COMPANY, Mundelein, IL (US)

( * ) Notice: Subject to any disclaimer, the term of this patent is extended or adjusted under 35 U.S.C. 154(b) by 0 days.

(21) Appl. No.: 17/069,649

(22) Filed: Oct. 13, 2020

(65) Prior Publication Data

US 2021/0039588 A1 Feb. 11, 2021

Related U.S. Application Data

(63) Continuation-in-part of application No. 16/578,787, filed on Sep. 23, 2019, now Pat. No. 11,034,329, (Continued)

(51) Int. Cl.
*B60R 25/10* (2013.01)
*G08B 25/00* (2006.01)
(Continued)

(52) U.S. Cl.
CPC ............ *B60R 25/1001* (2013.01); *B60B 3/16* (2013.01); *B60C 9/00* (2013.01); *B60Q 9/00* (2013.01);
(Continued)

(58) Field of Classification Search
CPC ..... B60B 3/16; B60Q 9/00; B60R 2025/1016; B60R 25/1001; B60R 25/1004; B60R 25/24; F16B 37/14; F16B 41/005
See application file for complete search history.

(56) References Cited

U.S. PATENT DOCUMENTS

| 4,718,282 A | 1/1988 | Bonfils |
| 5,552,759 A * | 9/1996 | Stoyka ................ B60R 25/1001 |
| | | 116/28 R |

(Continued)

FOREIGN PATENT DOCUMENTS

| CA | 2536801 A1 | 3/2005 |
| DE | 102004051865 A1 | 11/2006 |

(Continued)

OTHER PUBLICATIONS

Extended European Search Report dated Sep. 5, 2018 of European application No. 17198828.0, 7 pages.

(Continued)

*Primary Examiner* — Omeed Alizada
(74) *Attorney, Agent, or Firm* — Brooks Kushman P.C.

(57) ABSTRACT

A wheel fastener alarm assembly is provided having a fastener body with a first portion defining a wrenching surface and a cavity, and a second portion with a threaded portion to attach and detach from a wheel of a vehicle. A sensor array is disposed in the cavity of fastener body to detect an attribute of the fastener body and generate an output signal based on the attribute of the fastener body. An antenna connected to the sensor array to transmit the signal (Continued)

to a remote location. A cap is secured to the first portion of the fastener body and covers the wrenching surface and the cavity opening to define a capped fastener body.

18 Claims, 10 Drawing Sheets

Related U.S. Application Data which is a continuation of application No. 16/127,999, filed on Sep. 11, 2018, now Pat. No. 10,421,433, which is a continuation of application No. 15/788,204, filed on Oct. 19, 2017, now Pat. No. 10,099,655.

(60) Provisional application No. 62/414,444, filed on Oct. 28, 2016.

(51) Int. Cl.
| | |
|---|---|
| *G08B 25/10* | (2006.01) |
| *B60B 3/16* | (2006.01) |
| *B60Q 9/00* | (2006.01) |
| *F16B 37/14* | (2006.01) |
| *F16B 41/00* | (2006.01) |
| *G07C 5/08* | (2006.01) |
| *B60C 9/00* | (2006.01) |
| *B60R 25/24* | (2013.01) |

(52) U.S. Cl.
CPC .......... *B60R 25/1004* (2013.01); *B60R 25/24* (2013.01); *F16B 37/14* (2013.01); *F16B 41/005* (2013.01); *G07C 5/08* (2013.01); *G08B 25/008* (2013.01); *G08B 25/10* (2013.01); *B60R 2025/1016* (2013.01); *B60Y 2400/301* (2013.01); *B60Y 2400/304* (2013.01)

(56) References Cited

U.S. PATENT DOCUMENTS

| | | | |
|---|---|---|---|
| 7,994,901 B2 | 8/2011 | Mailis | |
| 8,125,323 B2 | 2/2012 | Stephan | |
| 8,525,653 B1 | 9/2013 | Bing | |
| 8,730,036 B2 | 5/2014 | Tsujihama | |
| 8,872,668 B2 | 10/2014 | Schnare | |
| 9,085,196 B2 | 7/2015 | Dooner | |
| 9,360,040 B2 | 6/2016 | Milligan | |
| 2003/0095039 A1 | 5/2003 | Shimomura et al. | |
| 2007/0222564 A1 | 9/2007 | Kobayashi | |
| 2008/0018478 A1 | 1/2008 | Russell | |
| 2009/0207008 A1 | 8/2009 | Malis | |
| 2013/0216330 A1* | 8/2013 | Milligan | ................ F16B 37/14 411/429 |
| 2014/0104048 A1* | 4/2014 | De Kock | ................ F01N 11/00 340/429 |
| 2016/0075296 A1 | 3/2016 | Alderman | |

FOREIGN PATENT DOCUMENTS

| | | |
|---|---|---|
| DE | 102007015927 A1 | 10/2008 |
| DE | 102011017604 A1 | 10/2012 |
| JP | 61-135844 A | 6/1986 |

OTHER PUBLICATIONS

Final Office Action of U.S. Appl. No. 16/578,787 dated Oct. 28, 2020, 16 pages.

\* cited by examiner

700

Installing a wheel fastener alarm onto a wheel stud

760

Activating the sensor array in the wheel fastener alarm

762

Detecting an attribute related to the wheel stud within the wheel nut

764

Sending a signal from the wheel fastener alarm to the vehicle's alarm system regarding the status of the wheel stud within the wheel nut

766

Sounding the vehicle's alarm system if the status indicates the detected attribute is outside a predetermined deviation from a reference value

WHEEL FASTENER ALARM

CROSS-REFERENCE TO RELATED APPLICATIONS

This application is a continuation-in-part of U.S. application Ser. No. 16/578,787 filed Sep. 23, 2019, issued as U.S. Pat. No. 11,034,329, which is a continuation of U.S. application Ser. No. 16/127,999 filed Sep. 11, 2018, issued as U.S. Pat. No. 10,421,433, which is a continuation of U.S. application Ser. No. 15/788,204, filed Oct. 19, 2017, now issued as U.S. Pat. No. 10,099,655, which claims the benefit of U.S. provisional Application Ser. No. 62/414,444, filed Oct. 28, 2016, the disclosures of which are hereby incorporated in their entirety by reference herein.

TECHNICAL FIELD

The present application relates generally to wheel fasteners, and more particularly, to a wheel fastener alarm.

BACKGROUND

Wheel fastener locks are used on many types of vehicles to prevent unauthorized removal and theft of vehicle wheels. Conventional wheel fastener locks require a special tool to remove the wheel fastener attached to the wheel. Thieves may circumvent the need for a special tool to remove conventional wheel fastener locks by breaking the wheel fastener off the wheel stud, such as with a strike bar. Accordingly, there is a need for an improved wheel fastener lock.

SUMMARY

According to at least one embodiment, a wheel fastener alarm assembly has a fastener body with a first portion defining a wrenching surface and a cavity, and a second portion with a threaded portion to attach and detach from a wheel of a vehicle. A sensor array is disposed in the cavity of fastener body to detect an attribute of the fastener body and generate an output signal based on the attribute of the fastener body. An antenna is connected to the sensor array to transmit the signal to a remote location. A cap is secured to the first portion of the fastener body and covers the wrenching surface and the cavity opening to define a capped fastener body.

In a further embodiment, the cap is formed of stainless steel.

In another embodiment, the antenna is arranged to transmit the signal when the capped fastener body is received by a fastening tool gripping the wrenching surface.

In a further embodiment, the antenna extends beyond the cap.

In another embodiment, the antenna extends from the wrenching surface toward the second portion.

In a further embodiment, the wrenching surface has a contoured section formed between adjacent wrenching faces, the contoured section having a radius less than a fastener point, wherein the antenna is routed along the contoured section.

In another embodiment, the fastener body has a flange extending radially from the wrenching surface, wherein a channel is formed within the flange; and the antenna is routed in the channel and extends below the flange.

In a further embodiment, the antenna comprises a first end connected to the sensor array and a circumferential portion positioned outside the cap.

In a further embodiment, the antenna further comprises a flexible extension segment connecting the sensor array to the circumferential portion.

In another embodiment, the circumferential portion of the antenna is encased in an antenna carrier being a different material than the cap.

According to at least one other embodiment, an alarm subassembly is provided for a vehicle wheel fastener and has a sensor housing sized to be retained in a cavity of the vehicle wheel fastener. A sensor array is contained in the sensor housing to detect an attribute of a fastener body and generates an output alarm signal based on the attribute of the fastener body. A power supply is contained in the housing. An antenna is connected to the sensor array to transmit the alarm signal to a remote location. The antenna is connected to the sensor array at a first end and extends beyond the cavity to a second end of the antenna.

According to at least one embodiment method of manufacturing a wheel fastener alarm provides a fastener body having a first portion defining a wrenching surface and a cavity. The fastener body has a second portion with a threaded portion to attach and detach from a wheel of a vehicle. A sensor array is inserted in the cavity of the fastener to detect an attribute of the fastener body and generate output an alarm signal based the attribute of the fastener body. A cap is secured to a first portion of the fastener body to cover the wrenching surface and to secure the sensor array to the fastener body.

In a further embodiment, the method connects an antenna to the sensor array to transmit an alarm signal to a remote location.

In a further embodiment, the method encases at least a portion of the antenna in an antenna carrier. The antenna carrier is crimped to the fastener body, external of the cap.

In a further embodiment, the method installs the antenna carrier to an outer surface of the fastener body and inserts the sensor array into the cavity after installing the antenna carrier.

In a further embodiment, the method forms the fastener body with a wrenching surface with a contoured section formed between adjacent wrenching faces, the contoured section having a radius less than a fastener point. The antenna is routed along the contoured section.

The inventions herein may include any of the following aspects in various combinations and may also include any other aspect described below in the written description or in the attached drawings.

BRIEF DESCRIPTION OF THE DRAWINGS

The invention may be more fully understood by reading the following description in conjunction with the drawings.

FIG. 7 is a flow chart of a method of operating a wheel fastener alarm.

DETAILED DESCRIPTION

Figure 1:
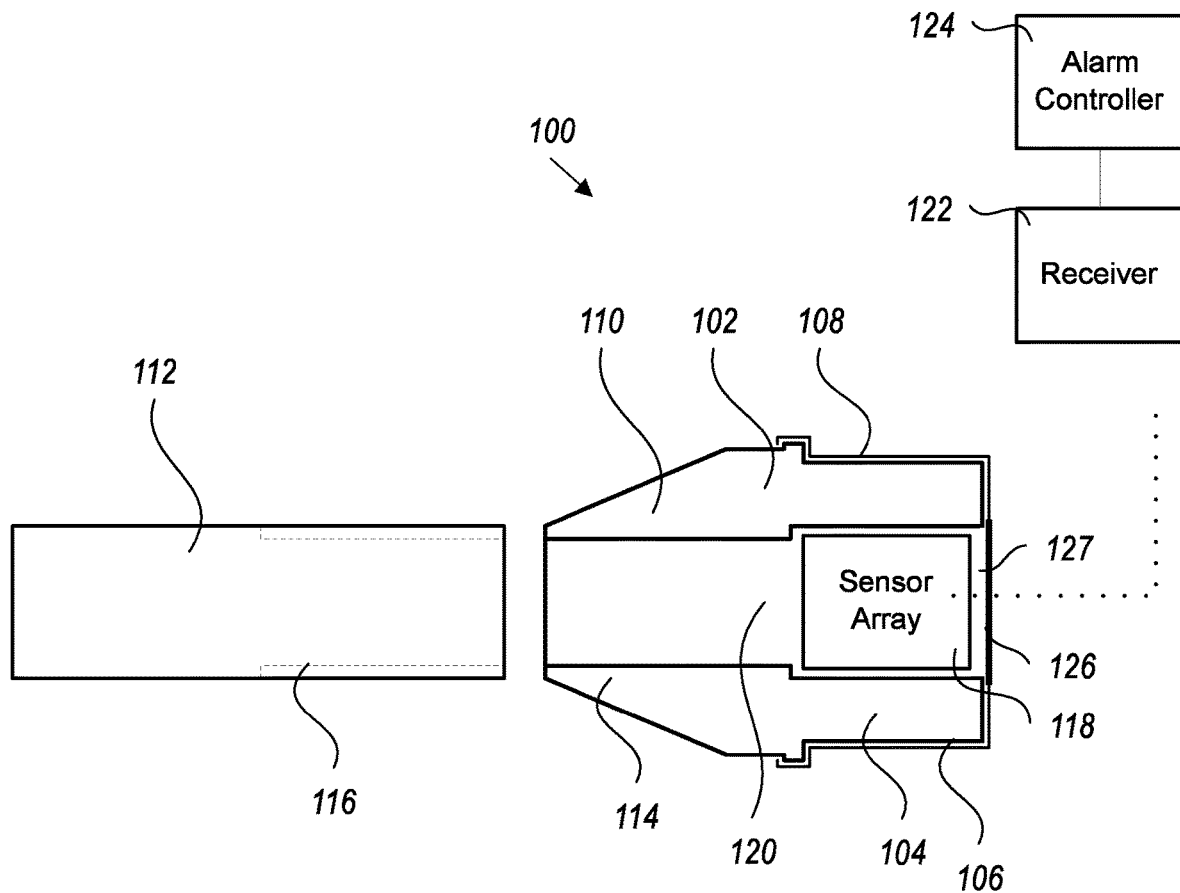
FIG. 1 is a schematic of a wheel fastener alarm.

Referring now to the figures, the wheel fastener alarm 100 includes a capped automotive wheel nut 102, as shown in FIG. 1. In some embodiments, the capped automotive wheel nut 102 may be a stainless steel capped automotive wheel nut. The top portion of the nut body 104, including the wrenching surfaces 106, may be covered by the cap 108 that could be made of stainless or another appropriate capping material. Thus, when the wheel nut 102 is installed on a wheel stud 112, the nut body 104 itself is not visible to casual observers, and the cap 108 is the only part of the nut that is readily visible. However, the bottom portion of the nut body 110 is not covered by the cap 108 so that the nut 102 can be threaded onto the wheel stud 112 without the cap 108 interfering with the engagement of the nut threads 114 and stud threads 116.

The wheel fastener alarm 100 also includes a sensor array 118 to detect an attribute of the wheel stud 112 within the wheel nut 102. The attribute may be information used to detect an alarm condition related to the wheel nut 102, such as if the wheel nut 102 is being removed from the wheel stud 112. Attributes may include, for example, the position or location of the wheel stud within the wheel nut, an acceleration value of the wheel nut, a magnetic field around the wheel nut, shock value of the wheel nut, a vibration value of the wheel nut on the wheel stud, or a temperature of the wheel nut. The sensor array 118 may be designed to fit within the cavity 120 in the wheel nut 102. The sensor array 118 may be integral with the wheel nut 102. The wheel nut 102 may be sized similarly to a conventional wheel nut. For example, the amount of space within the cavity 120 to house the sensor array 118 may be a cylindrical space approximately 15 mm wide by 14 mm long. Depending on the length of the wheel stud 112, the amount of available space may be reduced to approximately 9 mm. The sensor array 118 may use a variety of methods (as discussed below) to detect the attribute of the wheel stud 112.

The sensor array 118 may transmit a signal to the receiver 122 regarding the attribute, such as detection or lack of detection of the wheel stud 112 within the wheel nut 102. The signal may indicate that the wheel nut 102 is attached to or detached from the wheel stud 112. Accordingly, the signal may be an indication that the wheel nut 102 is being removed from the wheel stud 112. The receiver 122 may relay the signal to an alarm controller 124. The alarm controller 124 may be a controller for a vehicle alarm system. Accordingly, the wheel fastener alarm 100 may be in communication with the vehicle's electronic systems, such as the vehicle's alarm system. The alarm controller 124 may activate the vehicle's alarm system based on the signal received from the sensor array 118 regarding the status of the wheel nut 102. Attempting to remove or tamper with the wheel fastener alarm 100 may activate the vehicle alarm system. When the wheel fastener alarm 100 is removed improperly, the vehicle alarm may generate sounds and initiate flashing lights. Similarly, if the wheel fastener alarm 100 is damaged, the sensor array 118 may send a signal indicating damage to the alarm controller 124 through the receiver 122. The alarm controller 124 may then activate the vehicle's alarm system. Additionally or alternatively, the alarm controller 124 may transmit a signal regarding the vehicle's alarm system to a remote device, such as a mobile phone, a tablet, or a computer. The receiver 122 and the alarm controller 124 may be located remotely from the wheel nut 102 and the wheel stud 112, such as in a different part of the vehicle or remote from the vehicle. The receiver 122 may include CAN and LIN buses to allow the receiver 122 to be used as a development platform in some applications, such as when the wheel fastener alarm 100 is installed by original equipment manufacturers.

The wheel fastener alarm 100 may use distributed processing to determine if the vehicle alarm system should be activated based on the signal from the sensor array 118. The wheel fastener alarm 100 may rely on the alarm controller 124 to process the signal from the receiver 122 to determine if the attribute measured by the sensor array 118 warrants activating the vehicle alarm system based on other information not available to the wheel fastener alarm 100, such as other sensors associated with the vehicle. For example, the sensor array 118 may measure a temperature of the wheel nut 102 that deviates from a reference value, such as being lower than a reference value, and may transmit a signal to the receiver 122 indicating the measured temperature. The receiver 122 may send the signal to alarm controller 124. The alarm controller 124 may process the received signal and determine that the vehicle alarm system does not need to be activated because other sensors on the vehicle are also measuring a temperature deviation, indicating that other portions of the vehicle are at the lower temperature, as opposed to just the wheel nut 102 being at a lower temperature. Other portions of the vehicle being at the lower temperature may indicate that the wheel nut 102 is not being removed from the vehicle, but may indicate instead that the vehicle is in a cold location.

The wheel fastener alarm 100 may include a cover 126 placed over an opening 127 in the end of the cap 108. The cover 126 may be non-conductive or non-metallic to allow the signal from the sensor array 118 to pass through the cover 126 and reach the receiver 122. The cover 126 may, for example, be composed of a polymer. The cover 126 may include any color or pattern to provide a visual indication of the presence of the wheel fastener alarm 100 in order to decrease the probability that a thief attempts to steal the wheel that wheel fastener alarm is attached to. The color may be highly visible to an observer in comparison to the vehicle wheel and remainder of the wheel fastener alarm 100. For example, the cover 126 may be composed of a blue colored polymer to easily show an observer that the wheel nut attached to the wheel is a wheel fastener alarm 100.

Attenuation of the signal from the sensor array 118 to the receiver 122 due to the metallic nature of the wheel nut 102 and cap 108 may be minimized by adequately sizing the opening 127 in the end of the cap 108. The amount of attenuation is dependent on the size of the opening 127 and can be approximated as:

$$\text{Attenuation (dB)} = 20 \log(\lambda/2a),$$

where $\lambda$=wavelength and $a$=largest opening dimension.

The required transmit power can be approximated as:

$$\text{Tx Power (dBm)} = \text{Rx Sensitivity (dBm)} + 2 \times \text{antenna gain} + \text{path loss} + \text{cavity loss} + \text{vehicle attenuation}.$$

For an approximately 7.5 mm diameter opening 127, the transmit power is estimated as:

Tx Power (dBm)=−112 dBm+(2×17 dB)+39.2 dB (at 5 meters)+33.3 dB+10 dB (estimated)

Tx Power (dBm)=4.5 dBm minimum.

The transmit power of approximately 4.5 dBm is achievable with many low power transmitters in the appropriate frequency range. The size of the opening 127 may be adjusted to reduce the required transmit power.

The wheel fastener alarm 100 may be removed from the wheel stud 112 without any special tools beyond the tools that are normally required to remove a conventional wheel nut. The wheel fastener alarm 100 does not require a special key, socket, or wrench to be removed. The wheel fastener alarm 100 may be designed to operate on any type of vehicle and may tolerate the environmental and operating stresses associated with being mounted on the tire/wheel assembly of any vehicle. The wheel fastener alarm 100 may be capable of operating within a temperature range of −40° C. to +85° C.

The wheel fastener alarm 100 is located on the wheel of a vehicle; accordingly, the wheel fastener alarm 100 complies with design and test requirements suitable for applications associated with vehicle wheels. The wheel fastener alarm 100 is compatible with steel and aluminum wheel materials, such as high strength low allow steel, hot rolled low carbon steel, AA 356 aluminum, 6061 T6 aluminum, AA 5454 aluminum, and chrome clad wheels. The wheel fastener alarm 100 can withstand corrosion testing, such as 60 cycles of CETP: 00.00-R-311, or equivalent, without loss of function, serviceability, or significant degradation in appearance, including any galvanic contribution to degraded wheel appearance. An example matrix of tests that the wheel fastener alarm 100 may pass is listed below.

| Test Description | Example Criterion |
| --- | --- |
| 100% Functional Evaluation | Full parametric characterization −40 to +85 C. |
| Shipping/Storage | −50 to +90 C. for 160 hrs |
| Low Temperature Endurance | −20 C. for 1000 hrs |
| Low Temperature Operation | −40 C for 250 hrs |
| High Temperature Endurance | +85 C. at 85% humidity for 500 hrs |
| High Temperature Operation | +85 C. for 800 hrs |
| Powered Thermal Cycle | 500 cycles |
| Thermal Shock Resistance | 100 cycles |
| Powered Vibration | 20 hrs |
| Mechanical Shock And Drop | 10 shocks per axis, 10 drops from 1 m |
| Humidity/Temperature Cycle | −10 C. to +60 C. at 95% humidity for 250 hrs |
| Water/Fluids Ingress | IPX5 |
| Salt Mist Atmosphere | 96 hrs |
| Chemical Resistance | Various |
| Dust Test | IP5KX |
| High Pressure Steam Jet | IPX9K |
| Thermal Shock Endurance | −40 to +85 C. for 500 hrs |
| FCC Part 15 Compliance | Various |
| EMC Compatibility/Immunity | Various |

The wheel fastener alarm 100 can be tested and programmed prior to installation on a vehicle. For example, a low power, low frequency receiver may be included in the wheel fastener alarm 100 to allow testing and programming to occur on the assembly line or during service at a vehicle's dealership.

The wheel fastener alarm 100 may use the sensor array 118 to detect if the wheel nut 102 is loose or loosening from the wheel stud 112. If the sensor array 118 detects the distance between the sensor array 118 and the wheel stud 112 is increasing, the sensor array 118 may transmit a signal to the alarm controller 124 indicating that the wheel nut 102 is loose or loosening from the wheel stud 112. The signal may be an early indication of the wheel nut 102 loosening, such that a vehicle operator may take corrective action and tighten the wheel nut 102 before the wheel nut 102 detaches from the wheel stud 112. Similarly, the wheel fastener 100 may indicate if an entire wheel is loose or loosening from a vehicle if the wheel fastener 100 is installed on all the wheel studs 112 of a vehicle's wheel. If one or more of the wheel fastener alarms 100 are loose or loosening, the alarm controller 124 may determine that the wheel is loose and may signal the vehicle operator to take corrective action.

Figure 2:
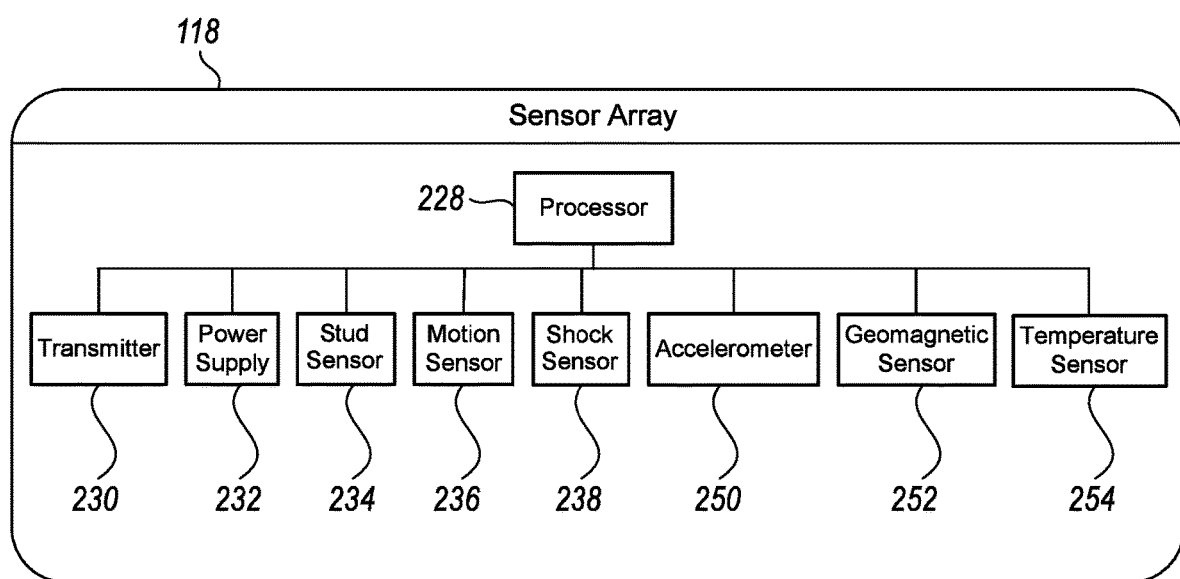
FIG. 2 is a schematic of a sensor array of a wheel fastener alarm.

Referring to FIG. 2, the sensor array 118 may include components such as a processor 228, transmitter 230, power supply 232, wheel stud sensor 234, motion sensor 236, shock sensor 238, accelerometer 250, geomagnetic sensor 252, and temperature sensor 254.

The processor 228 may be implemented as a microprocessor, microcontroller, application specific integrated circuit (ASIC), discrete logic, or a combination of other types of circuits or logic. Numerous options exist for the processor 228. For example, the processor 228 may be a Microchip PIC16LF1824T39A family of microcontrollers that include integrated radio frequency transmitters. The processor 228 may be an Infineon SP370-25-106-0, a Freescale FXTH871511DT1, or a Melexis MLX91801. Freescale FXTH71511DT1 may be the best of the integrated chip solutions, but may be more expensive than other options. The Microchip PIC16LF1824T39A may provide a low cost solution with ample radio frequency output power, low frequency receive capability for service, the ability to auto arm/disarm in original equipment manufacturer applications, and other options to reduce system power consumption. The Microchip PIC16LF1824T39A may also interface easily with the sensors used in wheel fastener alarm 100.

The power supply 232 may include a replaceable or rechargeable source of power, such as one or more batteries. The power supply 232 may be sufficient to power the wheel fastener alarm 100 for many years and in some instances approximately 10 years. Additionally or alternatively, the power supply 232 may be sufficient to power the wheel fastener alarm 100 for the amount of time it typically takes for a vehicle carrying the wheel fastener alarm 100 to travel approximately 100,000 miles. The power supply 232 may fit in a cylindrical space approximately 12 mm in diameter and 5 mm deep. Alternative spaces for the power supply 232 may also be used. The power supply 232 may be a custom designed battery or may be an off the shelf battery, such as a CR1225 coin cell battery. The power supply 232 may be a rechargeable lithium-ion battery that is charged remotely, such as by a low frequency receiver. The sensor array 118 may include additional circuitry and software to regulate charging the power supply 232. Additionally, or alternatively, an external charging station may be used.

The wheel stud sensor 234 may detect the position of the wheel stud 112 within the wheel nut 102. The position of the wheel stud 112 within the wheel nut 102 may be determined with an accuracy of approximately 1 mm. The wheel stud sensor 234 may transmit a signal to the processor 228 regarding the detection or lack of detection of the wheel stud 112 within the wheel nut 102. The processor 228 may then utilize the transmitter 230 to wirelessly send a signal to a remote location, such as the receiver 122, regarding the position of the wheel stud 112 within the wheel nut 102. As discussed previously, the vehicle's alarm system may activate if the wheel stud sensor 234 does not detect the wheel stud 112 within the wheel nut 102. The processor 228 may also periodically utilize the transmitter 230 to transmit a signal indicating that the wheel stud 112 is located within the wheel nut 102 and confirm that the wheel fastener alarm 100 is operational.

The transmitter 230 may communicate with the vehicle's alarm system using the existing vehicle systems, such as the tire pressure management system or remote keyless entry system. Communication with the vehicle's systems may utilize the vehicle's low power radio frequency data link at approximately 315 MHz or 434 MHz. The use of existing vehicle communication systems by the wheel fastener alarm 100 may not interfere with existing vehicle systems because the wheel fastener alarm 100 may transmit most often when the existing vehicle systems are not transmitting. For example, the tire pressure management system transmits most often when the vehicle is moving, whereas the wheel fastener alarm 100 may only transmit when the vehicle is stationary. Additionally, or alternatively, a separate radio frequency receiver may be used to establish communication between the transmitter 230 and the vehicle's systems.

The wheel stud sensor 234 may use a variety of methods to detect the position of the wheel stud 112 within the wheel fastener alarm 100. The table below provides characteristics for capacitive, magnetic, inductive, and optical methods of detection.

addition to the low cost and component count, capacitive proximity sensors consume very little power. Experiments with capacitive proximity sensors using a 5 mm PCB sensing element demonstrate a maximum detection range of a wheel stud in a wheel nut of 1.7 mm. Larger sensing elements increase the detection range. However, the nut body in close proximity to the larger sensing element may have the effect of shorting the electric field. This may make it difficult to differentiate between the wheel stud and the wheel nut, so the wheel stud position cannot be detected reliably. The shorting effect can be mitigated somewhat by the choice of a sensing element with small geometry relative to the wheel nut size. This smaller sensing element significantly affects range, resulting in a maximum detection of approximately 1.7 mm with a 5 mm sensing element. While the capacitive sensing method could normally be used to reliably detect the stud, the presence of the fastener body may make it impractical. One possible improvement would be the use of a less ferrous material such as stainless steel for the wheel nut body.

Magnetic (Inductive Hall Effect) sensors vary their output voltage in response to a magnetic field. The common implementation, such as a proximity switch, simply senses the presence of the field generated by a magnet. More complex implementations are possible where metallic objects in close proximity alter the magnetic field and cause a measurable change to the output voltage of the sensor. Operation of the sensor is dependent upon characteristics of the magnetic materials and lot to lot distribution of the magnets along with the physical placement of the magnet, electronics, and object

| Description | Design Requirement | Capacitive | Inductive Hall Effect | Inductance to Digital Converter | Optical |
|---|---|---|---|---|---|
| Equipment | | Microchip PIC16LF1824T39A | TIDRV5013 and Microchip | TI LDC1101DR | AMS TMD 27723 |
| Package Size | | N/A (part of control IC) | L: 2.9 mm W: 2.37 mm H: 1 mm Plus Magnet | L: 3 mm W: 3 mm H: 0.9 mm | L: 3.94 mm W: 2.36 mm H: 1.35 mm |
| Field Type | | Electric | Magnetic | Magnetic | Light |
| Detection Range | 1-5 mm | 0-1.7 mm | 1-3.5 mm | 0-4.5 mm | 1-15 mm |
| Supply Voltage | 2.5-3.0 VDC | 1.8-3.6 VDC | 2.5-5.5 VDC | 1.71-3.46 VDC | 2.6-3.6 VDC |
| Supply Current (Active) | | 35 uA | 2.7 mA | 3.2 mA | 12.5 mA |
| Detection Time | | 20 us | 50 us | 2 ms | 2.8 ms |
| Wake From Sleep | Desirable | Yes | Possibly | No | Yes |
| Emitter/Detector Type | | PCB Trace | Magnet/IC | PCB Trace | LED |
| I/O Control Pins Required | | 2 | 2 | 5 | 4 |
| Complexity | | Low | High (requires custom design magnet) | Low | Low |
| Operating Temperature Range | | −40 C. to +85 C. | −40 C. to +85 C. | −40 C. to +85 C. | −30 C. to +85 C. |
| Base Cost (IC only) | | $0 (part of control IC) | $0.29/3000 (excluding magnet) | $2.99/3000 | $1.15/2500 |

Capacitive proximity sensors produce an electric field and can be used to sense a variety of materials such as metal, solids, liquids, or the human hand. Introducing an object into the electric field results in a change in capacitance that is measurable. A capacitive sensor can be implemented using PCB traces combined with a capacitor and series resistor as the sensing element. Only two processor pins are required for control resulting in a very inexpensive solution. In being detected in the final system. Magnetic sensors are unaffected by harsh environments and can have a very long service life. Placing a magnet on the wheel stud so it can be easily detected by the Hall Effect element may present problems for use with the wheel fastener alarm 100 due to the service aspect where the magnet could be damaged or the wheel fastener alarm 100 inadvertently installed on the wrong wheel stud. If the magnet were incorporated with the electronics, concerns may include the available packaging space, achieving the necessary spacing and geometry to detect the wheel stud properly, and the ability to calibrate out the effects of the wheel fastener body.

Inductive sensors typically utilize an oscillator in combination with a resonant LC (inductor-capacitor) coil as a means for sensing the presence of an object such as metal. The magnetic field radiated by the coil induces eddy currents in the conductive object which alters the oscillator performance. This performance change is directly related to the distance between the metal object and the LC coil. As an example of an inductive sensor, the TI LDC1101 can simultaneously measure the impedance and resonant frequency of an LC resonator with very high resolution allowing it to sense the proximity and movement of conductive materials. By monitoring the amount of power injected into the resonator, the LDC1101 determines the equivalent parallel resistance of the resonator which it returns as a digital value. It also measures the oscillation frequency of the LC circuit by comparing the sensor frequency to a reference frequency which can then be used to determine the inductance of the LC circuit. Tests show that presence of the wheel stud within the wheel nut is detectable over an approximately 1-4.5 mm range using the LDC1101. Calibration of the inductive sensor may be required to minimize the effects of the wheel nut body on detecting the wheel stud. Given the low component count and ability to compensate for the effects of the fastener body, an inductive sensor may be a good solution for sensing the position of the wheel stud. A further advantage is that the LDC1101 will operate to approximately 1.8V. If paired with the PIC16LF1824T39A processor option, the potential for significant reduction in current consumption is possible.

Optical sensors may have the potential for best detection range when sensing the wheel stud. For example, the AMS TMD 27723 integrates a highly focused LED light source and detector that will provide an approximately 15 mm sensing range. A primary concern with optical sensing is dust, dirt, or debris in the wheel nut cavity. Reflections from the inside wall of the wheel nut must also be accounted for with the possibility that the walls would require a non-reflective coating. In the case of the TMD 27723, current consumption at the lowest intensity setting is significantly more than other sensing options, which may require a custom power supply.

Motion sensor 236 may inhibit the wheel stud 112 sensing function of the wheel fastener alarm 100 when the vehicle is in motion. Additionally, or alternatively, the motion sensor 236 may prevent the transmitter 230 from sending a signal regarding the status of the wheel stud 112 or may instruct the alarm controller 124 to disregard the signal when the vehicle is in motion. The wheel fastener alarm 100 may only be activated and/or operate to signal theft of a wheel when the vehicle is parked. Accordingly, the wheel fastener alarm 100 may automatically not be used when the vehicle is in motion and may automatically arm when the vehicle is stationary. Restricting the use of the wheel fastener alarm 100 to when the vehicle is stationary may decrease power consumption. The motion sensor 236 may be a ball bearing type switch to sense motion to arm/disarm the wheel fastener alarm 100. A ball bearing style sensor has the advantage of being used in other vehicular applications and having low power consumption. The motion sensor 236 may also be an accelerometer to detect when the wheel fastener alarm 100 is moving.

In addition or alternative to motion the sensor 236, the wheel fastener alarm 100 may be armed or disarmed based on the presence of a keyfob for the vehicle. Similar to the unlock/lock functions of the vehicle's doors, the presence of a keyfob within an adequate distance of the vehicle may arm/disarm the wheel fastener alarm 100. For example, if the owner of the vehicle has the keyfob near the vehicle, the wheel fastener alarm 100 may automatically be disarmed to allow the owner to remove the wheel fastener alarm 100 from the wheel stud 112, such as to change a tire, without setting off the vehicle's alarm system.

The wheel fastener alarm 100 may also be armed/disarmed through a remote device, such as a mobile phone, a tablet, or a computer. A user may also be able to determine the status of the wheel fastener alarm 100 through a remote device, such as if it is operating properly or if it has initiated an alarm signal. The wheel fastener alarm 100 may also automatically inform a user through the remote device that an alarm signal has been initiated.

Additionally or alternatively, the wheel fastener alarm 100 may include a low frequency receiver that receives a signal from a low frequency initiator associated with the tire pressure management system in the vehicle. The signal could instruct the wheel fastener alarm 100 to arm or disarm. For example, the presence of the vehicle's keyfob may be detected by the tire pressure management system and the tire pressure management system may then send a signal to the wheel fastener alarm 100 indicating the presence of the keyfob. The wheel fastener alarm 100 may then automatically disarm.

Additionally or alternatively, the wheel fastener alarm 100 may be armed or disarmed manually from inside the vehicle, such as by a switch, to allow removal of the vehicle's wheels for any reason, such as tire replacement, tire rotation, or tire repair. Additionally or alternatively, the wheel fastener alarm 100 may be automatically armed after the vehicle is stationary for a predetermined time period, such as a number of minutes or other time period.

The shock sensor 238 may detect if the wheel fastener alarm 100 is being removed by force, such as being broken off with a strike bar used to shear off the wheel nut 102. The shock may be sensed as an overdamped vibration present on three axes (x, y, z). Tests show that the shock felt by the wheel fastener alarm 100 from a strike bar or similar tampering force may last approximately 200 ms. Accordingly, the shock sensor 238 may sample the wheel fastener alarm 100 for force/vibration every 200 ms in order to detect a tampering force/vibration. The duration of the sampling/detection time may be extended based on ringing that may occur in the wheel fastener alarm 100 after the tampering force/vibration or may be extended based on the vibration that occurs after the wheel fastener alarm 100 falls to the ground as a result of a tampering force/vibration. Using an accelerometer for the shock sensor 238 may require a high power capacity if a force/vibration sample is required approximately every 200 ms. The shock sensor 238 may be required to consume very low power in order to extend the operating life of the wheel fastener alarm 100. Accordingly, the shock sensor 238 may be a ball bearing sensor, such as the SignalQuest SQ-MIN-200, that provides simple switch closures and is implemented carefully with interrupt pins.

The accelerometer 250 may detect tampering with the wheel fastener alarm 100 by detecting movement or a change in position of the wheel nut 102. The processor 228 may use the sensor array 118, or some other means, to ascertain a reference position of the wheel nut 102, such as a position defined by X, Y, and Z coordinates, at the time the wheel fastener alarm 100 is armed. The processor 228 may periodically ascertain the current position of the wheel nut 102 and compare it to the reference position. The wheel fastener alarm 100 may activate the vehicle alarm system if the current position does not match the reference position within a predefined amount.

The geomagnetic sensor 252 may detect tampering with the wheel fastener alarm 100 by detecting a change in the magnetic field around the wheel nut 102. The geomagnetic sensor 252 may measure a reference magnetic field around the wheel nut 102 at the time the wheel fastener alarm 100 is armed. The processor 228 may periodically compare a current magnetic field around the wheel nut 102 with the reference magnetic field to detect if a magnetic object, for example a lug wrench, is being applied to the wheel nut 102. The wheel fastener alarm 100 may activate the vehicle alarm system if the current magnetic field differs from the reference magnetic field by a predefined amount.

The temperature sensor 254 may detect tampering with the wheel fastener alarm 100 by detecting a change in temperature around the wheel nut 102. The processor 228 may periodically compare a current temperature measured by the temperature sensor 254 around the wheel nut 102 with the reference temperature to detect a change in temperature. A temperature change may indicate that the wheel nut 102 is being subjected to extreme temperatures in an effort to remove the wheel nut 102 from the wheel stud 112, such as by heating the wheel nut 102 up with a blowtorch or freezing the wheel nut 102 with dry ice. Extreme temperature changes may make it easier to remove the wheel nut 102 from the wheel stud 112. The wheel fastener alarm 100 may activate the vehicle alarm system if the current temperature differs from the reference temperature by a predefined amount.

The arrangement and packaging of the components of the sensor array 118 into the wheel nut 102 are robust enough to provide protection to the wheel fastener alarm 100 such that the wheel fastener alarm 100 can detect a tampering force/vibration and send a signal indicating a tampering force/vibration is occurring before becoming irreparably damaged. For example, the cap 108 and the cover 126 provide enough protection to the components within the wheel nut 102 to detect a tampering force/vibration before the wheel fastener alarm 100 is rendered inoperable. The arrangement and packaging of the components of the sensor array 118 into the wheel nut 102 are also robust enough to prevent damage to the wheel fastener alarm 100 and its components from the shock of an impact wrench being used to remove the wheel fastener alarm 100. The sensor array 118 may be seated within a plastic housing located in the wheel nut 102 in order to easy assembly and to reduce the shock and vibration experienced by the sensor array 118. Additionally or alternatively, a flexible potting compound or liquid silicon rubber may be used for shock reduction.

An embodiment of the wheel fastener alarm 100 cannot be disarmed by any external command or communication method in order to prevent unintended disarming of the system, such as by hacking, tampering, or other altering of the system. Because this embodiment of the wheel fastener alarm 100 cannot be disarmed, an alarm condition of this embodiment of the wheel fastener alarm 100 will only activate the vehicle alarm system if the vehicle alarm system is in the armed state. Accordingly, this embodiment of the wheel fastener alarm 100 is always armed, but will only activate the vehicle alarm system if the vehicle alarm system is armed.

Figure 3A:
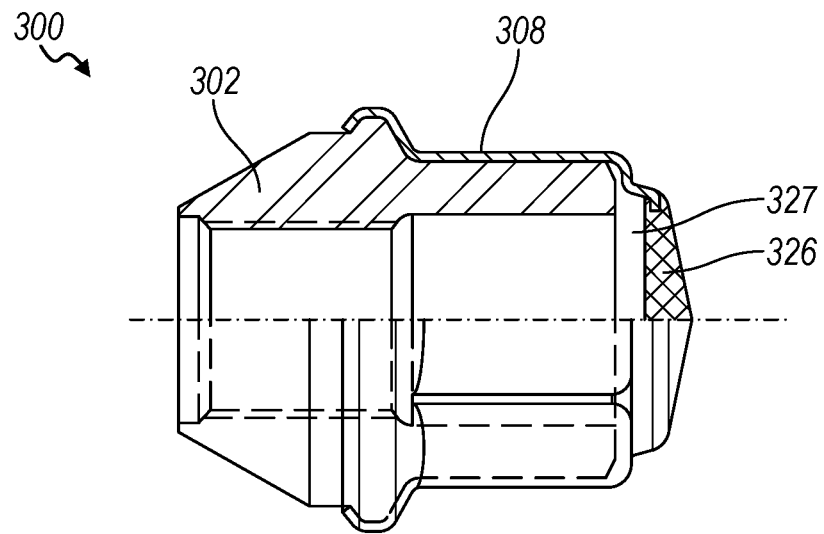
FIGS. 3A and 3B are a side cross-sectional view and an end view of a capped wheel nut of a wheel fastener alarm.
Figure 3B:
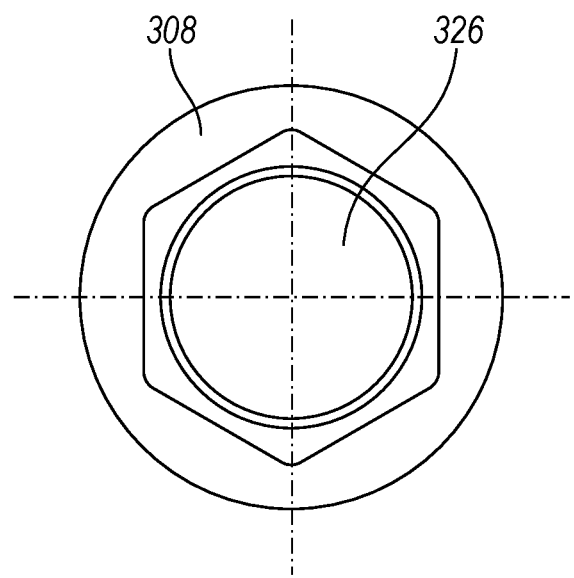

Referring to FIG. 3, FIG. 3A is a side cross-sectional view of an embodiment of the wheel fastener alarm 300, including wheel nut 302, cap 308, opening 327, and cover 326. FIG. 3B is an end view of the wheel fastener alarm 300, showing the cap 308 and the cover 326. The wheel fastener alarm 300 may include all the components and features of the wheel fastener alarm 100. The cover 326 may have a greater thickness at its center portion than its edge portions to provide protection to components contained within the wheel nut 302. The dimensions may be varied to suit the application of the wheel fastener alarm 300.

Figure 4A:
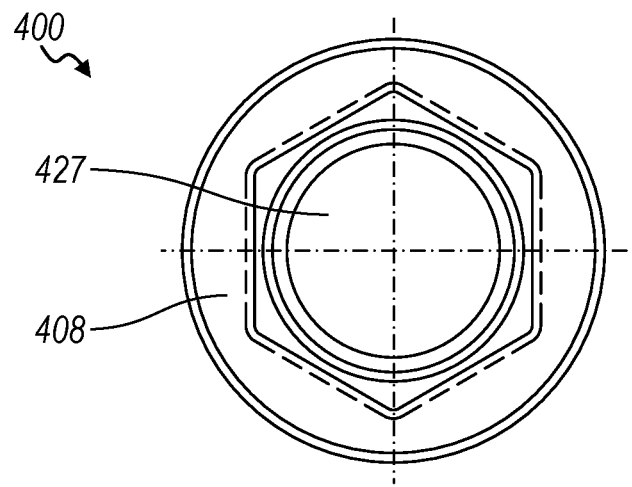
FIGS. 4A-4C are end and side views of a wheel nut cap of a wheel fastener alarm.
Figure 4B:
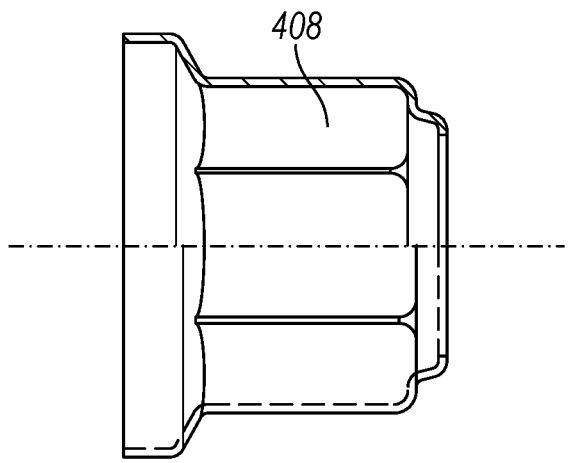
Figure 4C:
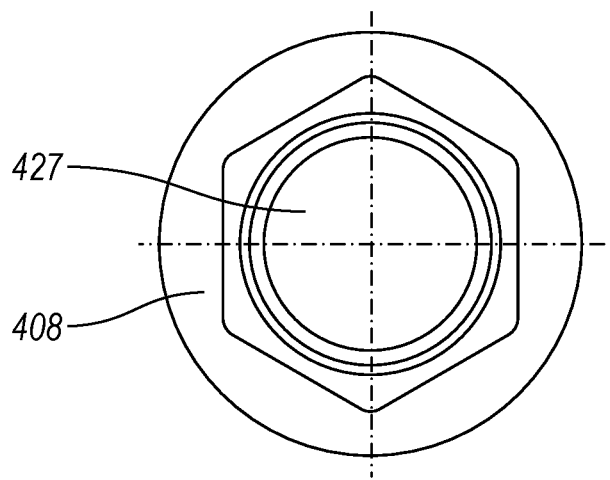

Referring to FIG. 4, FIG. 4A is an end view of an embodiment of the wheel fastener alarm 400, including cap 408 and opening 427. FIG. 4B is a side view of the cap 408. FIG. 4C is an end view of the cap 408 and the opening 427. The wheel fastener alarm 400 may include all the components and features of the wheel fastener alarm 100. The dimensions may be varied to suit the application of the wheel fastener alarm 400.

Figure 5:
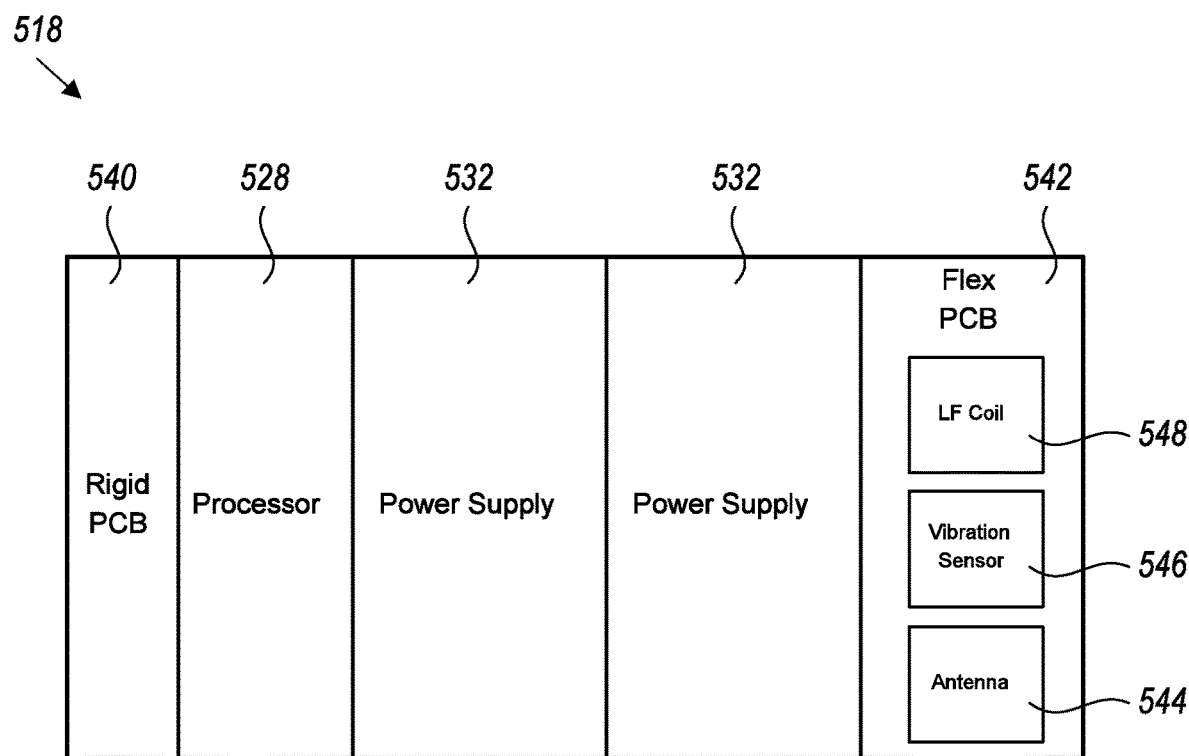
FIG. 5 is a schematic of a sensor array of a wheel fastener alarm.

FIG. 5 is a schematic of a sensor array 518 of an embodiment of a wheel fastener alarm. The wheel fastener alarm 500 may include all the components and features of the wheel fastener alarm 100. The sensor array 518 includes a rigid-flex PCB assembly. The Rigid PCB 540 may be positioned near the wheel stud 512 (not shown). The Flex PCB 542 may be positioned near the cover 526 (not shown) in order to optimize the performance of the antenna 544. The processor 528 may be located on the rigid PCB 540. The sensor array 518 may utilize one or more power supplies 532 to operate. FIG. 5 shows two power supplies 532 located between the rigid PCB 540 and the flex PCB 542. The power supplies 532 may be the same or different. For example, both the power supplies 532 may be CR1225 coin cell batteries. The power supply 532 may be any off the shelf or custom designed battery. The sensor array 518 may also include the vibration sensor 546. The vibration sensor 546 may combine the components and features of the motion sensor 236 and the shock sensor 238 discussed above. The vibration sensor 546 may be a ball bearing switch. The sensor array 518 may include the LF (low frequency) coil 548, which may, for example, be similar to a Coilcraft 4513TC-725XGLB RFID transponder coil.

Figure 6:
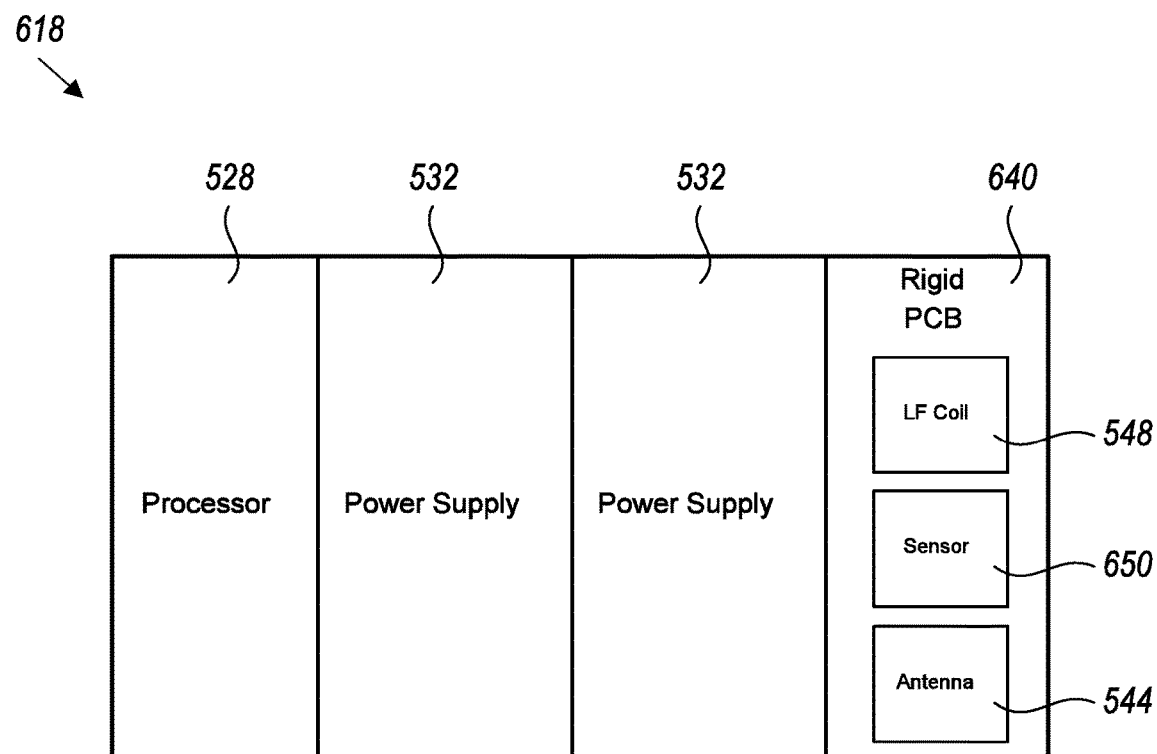
FIG. 6 is a schematic of a sensor array of another wheel fastener alarm.

FIG. 6 is a schematic of a sensor array 618 of an embodiment of a wheel fastener alarm. The wheel fastener alarm 600 may include all the components and features of the wheel fastener alarm 500. The sensor array 618 may include only a rigid PCB 640 and may not include a flex PCB. The sensor array 618 may include the sensor 650. The sensor 650 may be any type of sensor used to detect attributes related to the wheel nut 102, such as, for example, a stud position/location sensor, a motion sensor, a shock sensor, an acceleration sensor, a geomagnetic sensor, and a temperature sensor. The other components of the sensor array 618 may be the same as the sensor array 518.

FIG. 7 shows a flow chart of a method 700 of operating a wheel fastener alarm. The wheel fastener alarm used in conjunction with the method 700 may have the same components and features as the wheel fastener alarm 100. The flow of method 700 may begin with step 760 by installing a wheel fastener alarm onto a wheel stud, such as by interlocking the threads on the wheel nut in the wheel fastener alarm with the corresponding threads on the wheel stud. Step 762 may include activating the sensor array in the wheel fastener alarm. Step 764 may include detecting an attribute to determine an alarm condition related to the wheel stud. Attributes may include the position of the wheel stud within the wheel nut, an acceleration value of the wheel nut, a magnetic field around the wheel nut, shock value of wheel nut, a vibration value of the wheel nut on the wheel stud, or a temperature of the wheel nut. Step 766 may include sending a signal from the wheel fastener alarm to the vehicle's alarm system regarding the status of the wheel stud within the wheel nut. The status may be determined by comparing the detected attribute with a reference value. Step 768 may include sounding the vehicle's alarm system if the status indicates that the detected attribute is outside a predetermined deviation from the reference value. The alarm may indicate that the wheel stud is not within the wheel nut. Such an alarm may indicate that the wheel of the vehicle is being stolen.

Methods or processes may be implemented, for example, using a processor and/or instructions or programs stored in a memory. Specific components of the disclosed embodiments may include additional or different components. A processor may be implemented as a microprocessor, microcontroller, application specific integrated circuit (ASIC), discrete logic, or a combination of other types of circuits or logic. Similarly, memories may be DRAM, SRAM, Flash, or any other type of memory. Parameters, databases, and other data structures may be separately stored and managed, may be incorporated into a single memory or database, or may be logically and physically organized in many different ways. Programs or instruction sets may be parts of a single program, separate programs, or distributed across several memories and processors.

Figure 8:
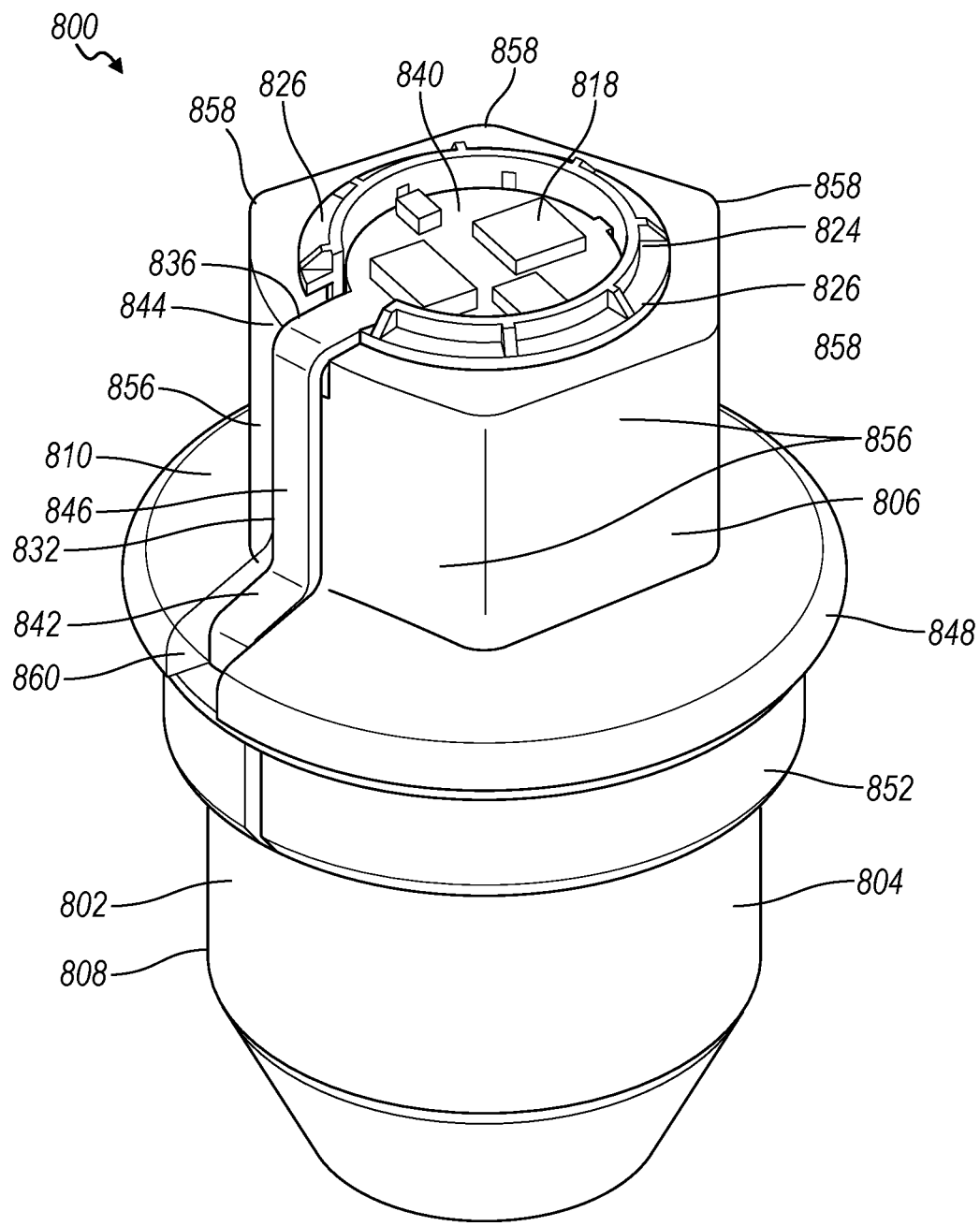
FIG. 8 is a perspective view of a wheel fastener with the cap removed to show an alarm subassembly in more detail.
Figure 9:
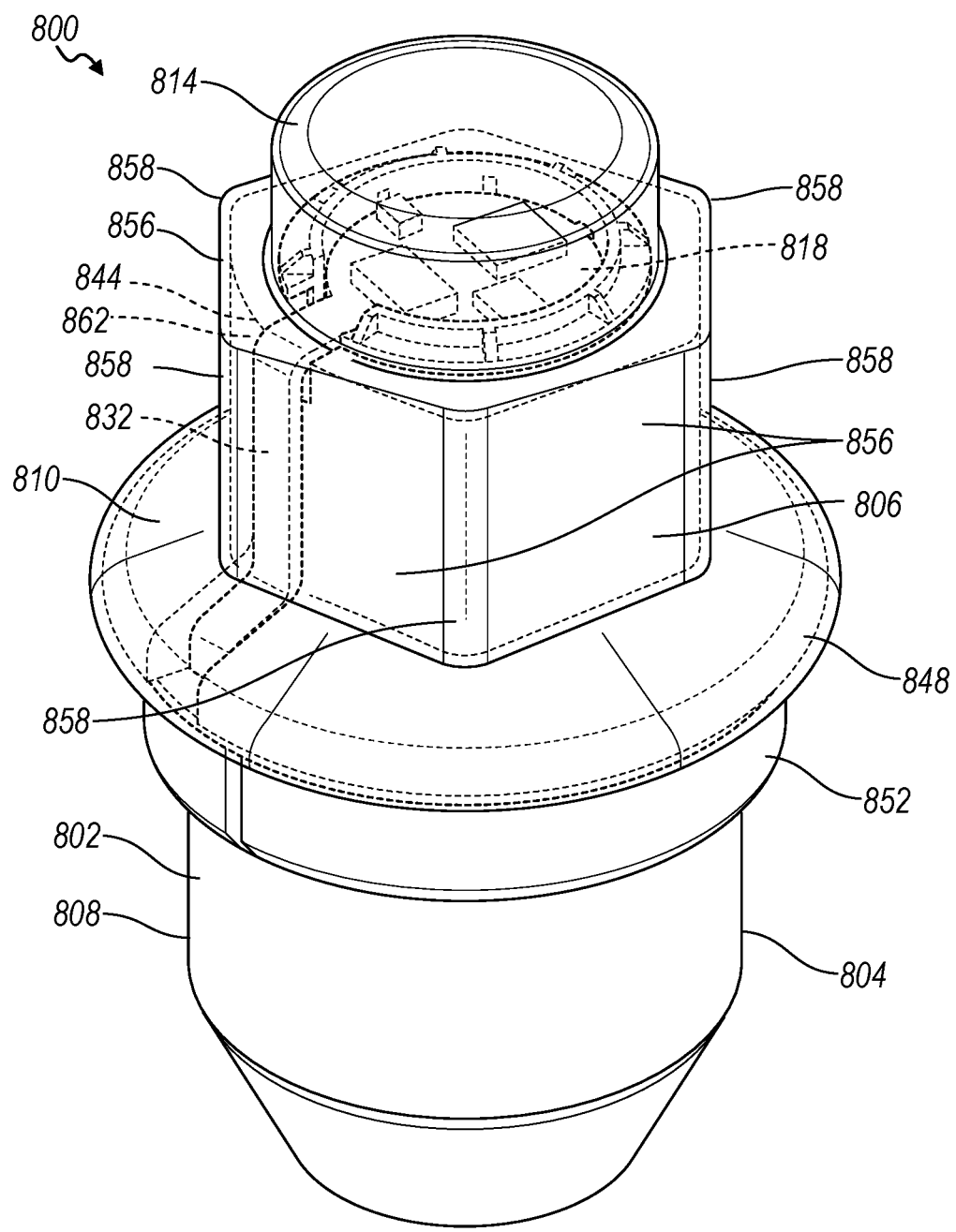
FIG. 9 is a perspective view of the wheel fastener and alarm subassembly of FIG. 8 including the cap.

FIGS. 8-11 illustrate a further embodiment of a wheel fastener alarm assembly 800. Referring to FIG. 8, FIG. 8 is a perspective view of the wheel fastener alarm assembly 800 with the cap removed. As illustrated, the wheel fastener alarm assembly 800 is a wheel nut 802 having a fastener body 804. As illustrated in FIGS. 8-9, the fastener body may be a wheel nut body having internal nut threads along a bottom portion 808. Alternatively, the fastener body 804 may be a wheel stud and have external stud threads along the bottom portion 808.

The wheel fastener alarm assembly 800 may be a stainless steel capped automotive wheel fastener. As shown in FIG. 9, the top portion 810 of the fastener body 804, including the wrenching surfaces 806, may be covered by a cap 814 that could be made of stainless or another appropriate capping material. Thus, when the wheel nut 802 is installed on a wheel stud, the fastener body 804 itself is not visible to casual observers, and the cap 814 is the only part of the fastener that is readily visible. However, the bottom portion 808 of the fastener body 804 is not covered by the cap 814 so that the cap 814 does not interfere with the engagement of the nut threads and stud threads.

The wheel fastener alarm assembly 800 also includes a sensor array 818 to detect an attribute of fastener body. The sensor array 818 may include all the components and features of sensor arrays 118, 518, 618 illustrated and discussed in FIGS. 1-6. The attribute may be information used to detect an alarm condition related to the wheel nut 802, such as if the wheel nut 802 is being removed from the wheel stud. The sensor array 818 may be designed to fit within a cavity 820 in the wheel nut 802. The sensor array 818 may include components discussed above such as the processor, transmitter, power supply, wheel stud sensor, motion sensor, shock sensor, accelerometer, geomagnetic sensor, and temperature sensor. The wheel fastener alarm assembly 800 and sensor array 818 may be armed/disarmed and activated/deactivated as discussed above.

The wheel fastener alarm assembly 800 may have an alarm subassembly 830. The alarm subassembly 830 includes the sensor array 818 seated in an alarm housing 824 positioned in the cavity 820 of the fastener body 804. The alarm housing 824 may have a housing lip 826 to retain the housing 824 at the distal opening of the cavity 820 opposite the threaded end portion 828 of the cavity 820. The alarm housing 824 may be formed of plastic, or other suitable material. The sensor array 818 may include a printed circuit board (PCB) 840. At least a first segment of the 836 is connected to the PCB 840.

Figure 11:
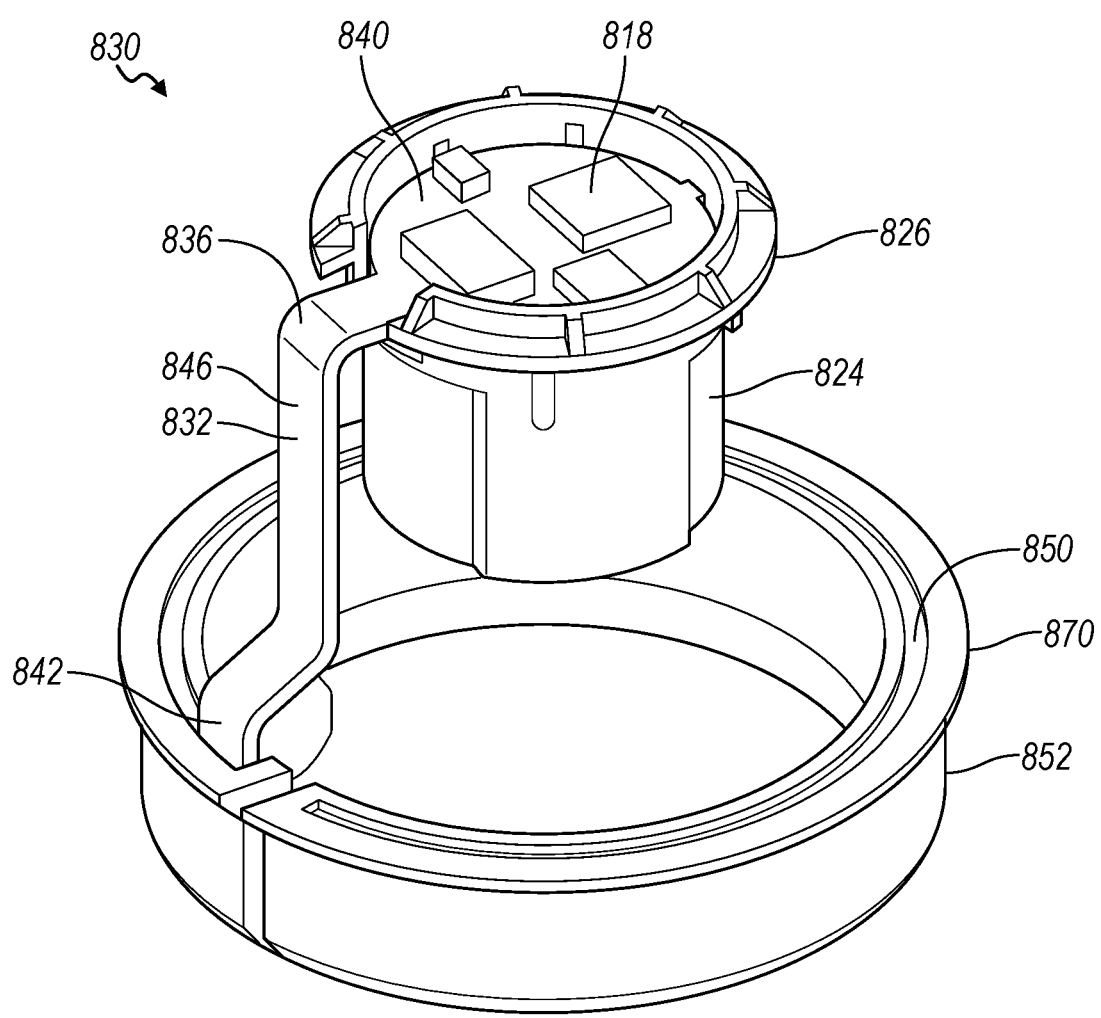
FIG. 11 is the alarm subassembly removed from the wheel fastener.

FIG. 11 illustrates the alarm subassembly 830 removed from the wheel fastener body 804. The alarm subassembly 830 has an antenna 832 that is connected to the sensor array 818 and configured to transmit the output signal from the sensor array 818 to a remote location. Other components such as LF coil, sensors, or processors may be located on the PCB 840. The sensor array 818 may have one or more power supplies 838. The power supplies 838 may be any suitable power supply or batteries.

The antenna 832 is arranged to transmit the output signal even when the capped fastener body 804 is received in a fastening tool, such as a socket wrench or lug wrench, that is gripping the wrenching surface 806 and covering the top portion 810 of the fastener body. As shown in section view in FIG. 10, the antenna 832 is routed to extend beyond the wrenching surface 806. As illustrated in the Figures, the wrenching surface may have a hexagonal circumference, however the wrenching surface may be another out-of-round surface or surface shape for use with a tool. For example, the wrenching surface may be a three-point fastener such as the fastener disclosed in U.S. Pat. No. 10,690,186 by Wilson et al., the disclosure of which is hereby incorporated in its entirety by reference herein. The wrenching surface may be a hybrid three-point fastener such as the fastener disclosed in U.S. patent Ser. No. 15/872,386 by Tomaszewski et al., the disclosure of which is hereby incorporated in its entirety by reference herein. The wrenching fastener may be part of a decorative security fastener such as U.S. Patent Ser. No. 62/950,096 by Southwood et al., the disclosure of which is hereby incorporated in its entirety by reference herein.

The antenna 832 is routed from the PCB 840 and extends beyond the cap 814 to a circumferential portion 850. The antenna 832 may be printed on the circuit board 840 and may be formed of several layers. For example, the antenna may be a flexible antenna and may include protective copper, solder, poly-film as well as other layers or materials. The antenna 832 extends from the PCB 840 at the first segment 836. The first segment 836 of the antenna 832 may be flexible to allow the antenna to bend and be routed along the wrenching surface 806 of the fastener body 804. The antenna 832 has an antenna extension portion 846 connecting the first segment 836 to the circumferential portion 850 of the antenna 832. The extension portion 846 of the antenna 832 may be rigid. A second segment 842 between the linear extension portion 846 and the circumferential portion 850 may be flexible to allow the antenna 832 to bend and be routed along the flange 848 of the fastener body 804.

As shown in FIG. 11, the circumferential portion 80 is encased in an antenna carrier 852. The extension portion 846 of the antenna 832 may be flexible to allow the antenna carrier 852 to be positioned on the outer circumference of the bottom portion 808 of the fastener body 804 while separately positioning the alarm housing 824 in the cavity 820. The antenna carrier 852 may be formed of plastic, a composite or suitable material to protect the antenna 832 while allowing transmission of signals.

The fastener body 804 has a wrenching surface 806 that is contoured to provide an area for routing the antenna 832. As shown in FIG. 8, the antenna 832 is routed along the wrenching surface 806 at one of the hexagonal points. Instead of a point 858 formed in the fastener body 804, the wrenching surface 806 has a chamfered or contoured section 844 between adjacent wrench faces 856. The contoured section 844 of the fastener body 804 has a radius less than the points 858. While the fastener body 804 is illustrated as a hexagonal fastener with five points 858 and one contoured section 844, any number of points or fastener shape is contemplated.

Figure 10:
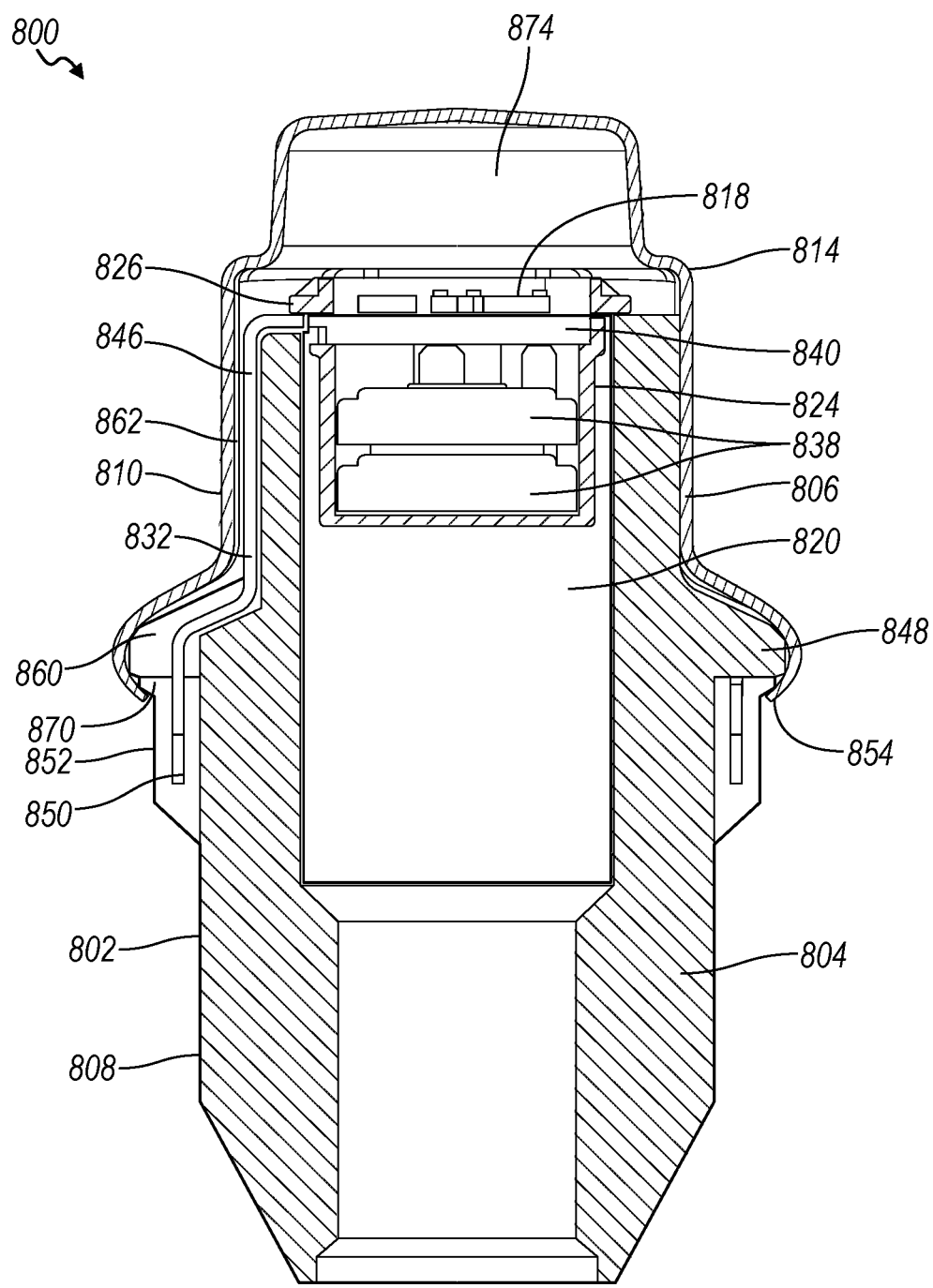
FIG. 10 is a section view of the wheel fastener alarm subassembly of FIG. 9 through section 9-9.

As shown in FIG. 10, the reduced radius of the contoured section 844 allows for an air gap 862 between the antenna 832 and cap 814. The air gap 862 may provide protection for the antenna 832. As illustrated in FIG. 9, the cap 814 is shaped to provide the fastener point 864 exteriors to the antenna 832. Once the cap 814 is installed, the wrenching surface 806 may have a standard wrenching configuration. As shown in FIG. 9, the wheel fastener 800 has a hexagonal wrenching surface 806 with six wrenching faces 856 and six points 858.

The fastener body 804 has a channel 860 formed along the flange 848 to allow the antenna 832 to be routed from the wrenching surface 806 and below the flange 848. In an alternative embodiment, the fastener body 804 may also have a channel segment along the wrenching surface 806 instead of the contoured section 844.

The flange 848 extends radially outward from wrenching surface 806. The cap 814 is generally shaped to conform to the wrenching surface 806 and the flange 848 to conceal the channel 860 and retain the antenna 832 in the channel 860.

The cap 814 has a bottom edge 854 that is bent around the flange 848 at the radially outer-most portion of the flange so the cap 814 is retained on the fastener body 804 without any welding or adhesive attachment between the cap 814 and the fastener body 804. The cap 814 is secured along the flange 848 and the antenna 832 extends below the flange 848 and cap 814. The circumferential portion 850 and antenna carrier 852 are positioned outside the cap 814.

As shown in FIG. 9, the cap 814 covers the distal opening of the cavity 820 and conceals the alarm housing 824 that is positioned in the cavity. The cap 814 may be formed of metal or conductive material, such as stainless steel. By routing the antenna 832 from the sensor array 818 within the cap to the second end located outside the cap, the antenna 832 is able to transmit the output signal of the sensor array 818, even when the fastener is in the process of being removed by a tool.

The alarm subassembly 830 may be installed on the fastener body 804 before securing the cap 814 to the fastener body 804. The antenna carrier 852 may be inserted over the bottom portion 808 of the fastener body 804 and positioned around the outer surface. An upper lip 870 of the antenna carrier 852 abuts the flange 848 of the fastener body 804.

The antenna 832 is aligned with the channel 860. The antenna carrier 852 may have an orientation feature to allow the antenna 832 to be easily oriented with the channel 860. Flexibility of the first and second segments 836, 842 of the antenna 832 allows the alarm housing 824 to be inserted in the cavity 820 after the installing the antenna carrier 852 on the fastener body 804. Alternatively, the alarm housing 824 may be inserted in the cavity 820 and the antenna carrier 852 may be secured to the fastener body 804 after the alarm housing 824 is installed. The antenna carrier 852 have an opening to allow the circumferential portion 850 to expand and fit over the flange 848.

After the cap 814 is installed on the fastener body 804, the alarm subassembly 830 is secured to wheel fastener. The cap 814 is crimped over the flange 848 and the bottom edge 854 contacts and engages the upper lip 870 of the antenna carrier 852 to provide a crimp around the circumference. The crimp between the cap 814 and the lip 870 may form a sealed enclosure for the alarm subassembly 830. The cap 814 covers the alarm housing 824 and forms a distal recess 874, as shown in FIG. 10. Other embodiments of the cap 814 may not provide any recess.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A wheel fastener alarm assembly comprising:
   a fastener body with a first portion defining a wrenching surface and a cavity, and a second portion with a threaded portion to attach and detach from a wheel of a vehicle;
   a sensor array disposed in the cavity of the fastener body to detect an attribute of the fastener body and generate an output signal based on the attribute of the fastener body;
   an antenna connected to the sensor array to transmit the signal to a remote location; and
   a cap secured to the first portion of the fastener body and covering the wrenching surface and the cavity opening to define a capped fastener body;
   wherein the antenna extends from the wrenching surface toward the second portion.

2. The wheel fastener alarm of claim 1, wherein the cap is formed of stainless steel.

3. The wheel fastener alarm assembly of claim 1, wherein the antenna is arranged to transmit the signal when the capped fastener body is received by a fastening tool gripping the wrenching surface.

4. The wheel fastener alarm assembly of claim 1, wherein the antenna extends beyond the cap.

5. The wheel fastener alarm assembly of claim 1, wherein the wrenching surface has a contoured section formed between adjacent wrenching faces, the contoured section having a radius less than a fastener point, wherein the antenna is routed along the contoured section.

6. The wheel fastener alarm assembly of claim 1, wherein the fastener body has a flange extending radially from the wrenching surface, wherein a channel is formed within the flange; and the antenna is routed in the channel and extends below the flange.

7. The wheel fastener alarm assembly of claim 1, wherein the antenna comprises a first end connected to the sensor array and a circumferential portion positioned outside the cap.

8. The wheel fastener alarm assembly of claim 7, wherein the antenna further comprises a flexible extension segment connecting the sensor array to the circumferential portion.

9. The wheel fastener alarm assembly of claim 7, wherein the circumferential portion of the antenna is encased in an antenna carrier being a different material than the cap.

10. An alarm subassembly for a vehicle wheel fastener comprising:
    a sensor housing sized to be retained in a cavity of the vehicle wheel fastener having a fastener body with a first portion defining a wrenching surface, and a second portion with a threaded portion to attach and detach from a wheel of a vehicle;

a sensor array contained in the sensor housing to detect an attribute of a fastener body and generates an output alarm signal based on the attribute of the fastener body;

a power supply contained in the housing; and an antenna connected to the sensor array to transmit the alarm signal to a remote location, the antenna connected to the sensor array at a first end and extending beyond the cavity to a second end of the antenna, wherein the antenna extends along the wrenching surface toward the second portion.

11. The alarm subassembly of claim 10, wherein the second end of the antenna comprises a circumferential portion configured to be secured to an outer surface of the vehicle wheel fastener.

12. The alarm subassembly of claim 11, wherein the circumferential portion of the antenna is encased in an antenna carrier.

13. The alarm subassembly of claim 11, wherein the antenna comprises at least one rigid segment and at least one flexible segment connecting the sensor array to the circumferential portion.

14. A wheel fastener alarm comprising the alarm subassembly of claim 10, and further comprising:

a fastener body with a first portion defining a wrenching surface and a cavity, and a second portion with a threaded portion to attach to, and detach from, a wheel of a vehicle, wherein the sensor array is secured in the cavity of fastener body; and a cap secured to the first portion of the fastener body and covering the wrenching surface to secure the alarm subassembly to the fastener body.

15. A method of manufacturing a wheel fastener alarm assembly comprising:

providing a fastener body having a first portion defining a wrenching surface and a cavity, the fastener body having a second portion with a threaded portion to attach and detach from a wheel of a vehicle;

inserting a sensor array in the cavity of the fastener to detect an attribute of the fastener body and generate output an alarm signal based the attribute of the fastener body; and securing a cap to a first portion of the fastener body to cover the wrenching surface, to secure the sensor array to the fastener body;

connecting an antenna to the sensor array to transmit an alarm signal to a remote location, wherein the antenna extends from the wrenching surface toward the second portion.

16. The method of claim 15, further comprising: encasing at least a portion of the antenna in an antenna carrier; and crimping the antenna carrier to the fastener body, external of the cap.

17. The method of claim 16 further comprising:

installing the antenna carrier to an outer surface of the fastener body; and inserting the sensor array into the cavity after installing the antenna carrier.

18. The method of claim 15, further comprising: forming the fastener body with a wrenching surface comprising a contoured section formed between adjacent wrenching faces, the contoured section having a radius less than a fastener point; and routing the antenna along the contoured section.

* * * * *